Sept. 17, 1957 E. O. ROOF Re. 24,356

MOWING MACHINE

Original Filed Feb. 27, 1946 2 Sheets-Sheet 1

Inventor

Earl Roof

By Ritter, Meeklin & Muir

Attorneys

MOWING MACHINE

Original Filed Feb. 27, 1946 2 Sheets-Sheet 2

Inventor

Earl Roof

By Ritter, Mechlin & Mills

Their Attorneys

United States Patent Office

Re. 24,356
Reissued Sept. 17, 1957

24,356

MOWING MACHINE

Earl O. Roof, Pontiac, Ill.

Original No. 2,491,768, dated December 20, 1949, Serial No. 650,438, February 27, 1946. Application for reissue April 24, 1957, Serial No. 656,174

7 Claims. (Cl. 56—25.4)

Matter enclosed in heavy brackets [ ] appears in the original patent but forms no part of this reissue specification; matter printed in italics indicates the additions made by reissue.

My invention relates to mowing machines and it has for its principal object the production of such a machine which can be easily handled and is adapted to cut close to fences or other obstructions without danger of the cutter blade contacting the obstructions.

*This application is a reissue of Patent No. 2,491,768, which issued December 20, 1949, for "Mowing Machine."*

A primary feature of the invention consists in providing a mowing machine with a cutter blade which revolves about an upright axis, the axis of rotation of the blade being inclined slightly forward in the direction of forward movement of the machine so that the blade revolves in a plane at an angle to the ground.

Another feature of the invention consists in providing the machine with a frame pivotally carried by a wheeled support, the forward end of the frame having an upright shaft provided with a revolving blade at its lower end and the opposite end of the frame having handle means for guiding the machine.

A further feature of the invention consists in providing the machine with a shield partially encircling the revolving blade which has a forwardly extending portion extending in the direction of forward movement of the machine.

A still further feature of the invention consists in providing the machine with a high weed gathering device which extends forwardly of the cutter blade into the material to be cut to prevent the machine from veering away from the direction in which it is intended to move when cutting material of relatively high growth.

Other features of the invention, residing in advantageous forms, combinations and relations of parts, will hereinafter appear and be pointed out in the claims.

Figure 1:
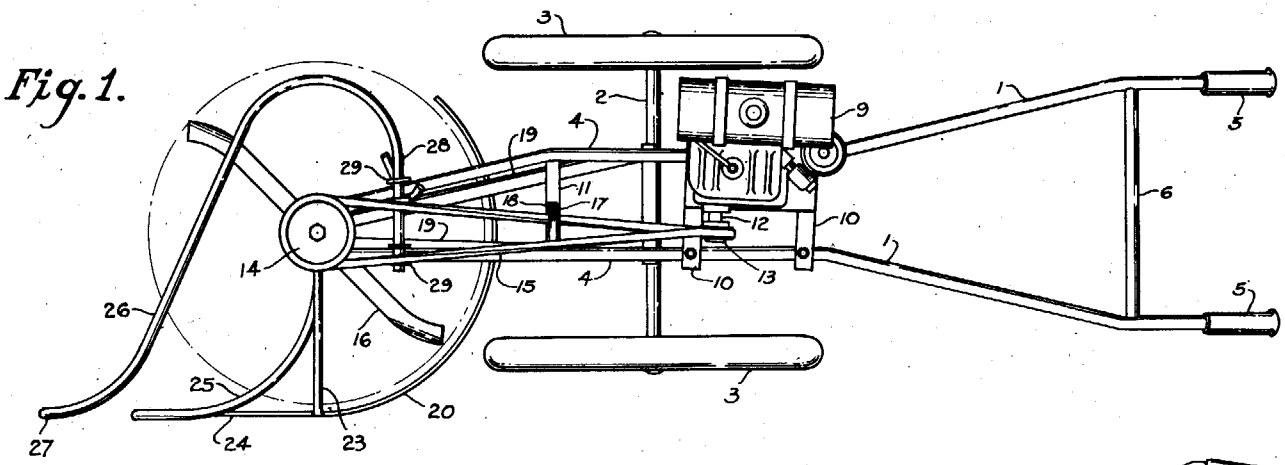
Figure 1 is a plan view of the mowing machine.
Figure 2:
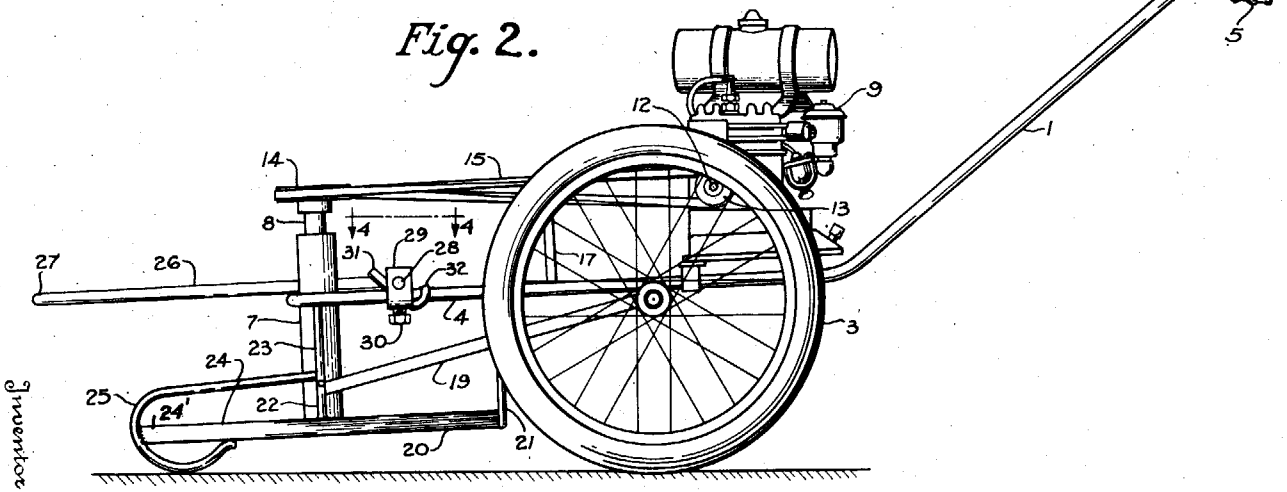
Figure 2 is a side view of the machine.
Figure 3:
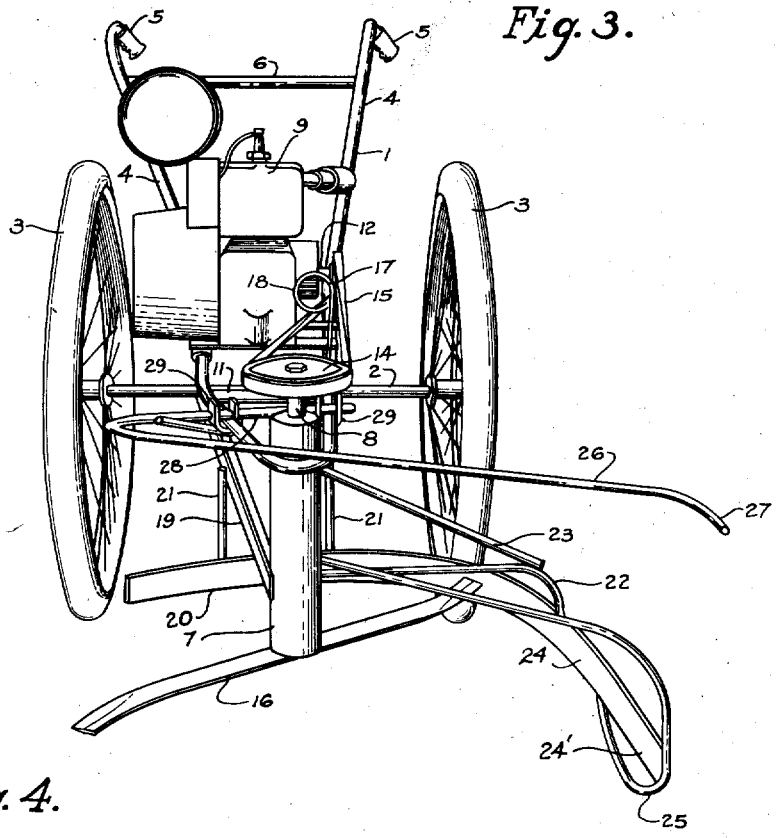
Figure 3 is a front view of the machine.
Figure 4:
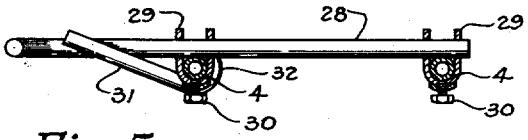
Figure 4 is an enlarged detail sectional view taken on line 4—4 of Figure 2.
Figure 5:
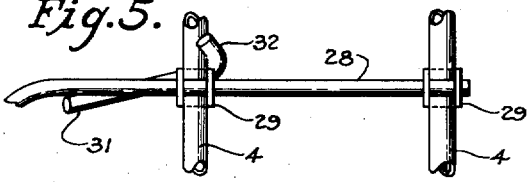
Figure 5 is a detail plan view of the construction illustrated in Figure 4.

Referring more particularly to the drawings, 1 indicates the frame of the machine which is preferably pivotally mounted on an axle 2 connecting a pair of wheels 3. Although the frame may be formed in any suitable way, it may advantageously be formed from one or more continuous cylindrical members 4 which at the rear of the machine incline upwardly and gradually diverge to provide two handle portions 5 by which the machine may be guided. Adjacent the handle portions, the members 4 may be rigidly held in spaced relation by a bar 6.

At the forward end of the machine, the members 4 preferably encircle and are rigidly secured to the upper portion of a collar or sleeve 7 surrounding an upright rotatable shaft 8. The members 4 which extend substantially horizontally from the sleeve 7 to a point at the rear of the axle 2 may be conveniently employed as means for supporting an internal combustion engine 9 of any suitable design. The engine is preferably supported on transverse bars 10 which are rigidly secured to the members of the frame. The members 4 may be also rigidly connected and maintained in spaced relation by a strut 11.

The engine 9 has a substantially horizontal driving shaft 12 having a pulley 13 mounted at its outer end. Rotary motion is transmitted from the pulley 13 to a sheave or pulley 14 mounted on the upper end of the upright shaft 8 journaled within the collar or sleeve 7 by an endless belt 15. To prevent undue wear of the belt, the axis of the pulley 13, although being substantially horizontally disposed, is inclined with respect to a vertical plane passing through the axle 2 of the machine.

Secured to the lower end of the shaft 8 is a cutter blade 16 which rotates at a relatively high speed for cutting grass, weeds and the like. To insure the belt being placed on pulley 14 to cause rotation of the cutter blade 16 in a cutting direction, a bracket 17 extends upwardly from adjacent the strut member 11 between the two sections of the endless belt. The upper end of the bracket terminates in a curved portion 18 so that, should the belt be unintentionally reversed, the portion thereof passing over the top of the pulley 13 will engage the curved portion of the bracket and thus prevent the belt from being associated with the sheave 14 in a manner which would cause the connected cutter blade to rotate in a reverse inoperative direction. The sleeve in which shaft 8 rotates is also connected to the frame by a pair of angle members 19 which at one end are secured to the lower portion of the sleeve and at their other ends are connected to the pivotal mounting of the main frame.

Partially encircling the path of the outer ends of the cutter blade 16 is a shield 20 which is supported at its inner end by a pair of bars or rods 21 which may be conveniently secured to the upwardly diverging angle members 19. At one side of the machine the shield is additionally supported by a horizontal member 22 which is curved downwardly at its outer end [24'] for connection to the shield, and by a downwardly inclined member 23 which is rigidly connected at its inner end to the sleeve 7 and to the horizontal support 22 at its outer end. Adjacent the supports 22 and 23, the shield continues forwardly as indicated at 24 practically tangentially to the path of movement of the outer ends of the blade 16 in the direction of forward movement of the machine, thereby serving as a guide enabling the cutter to be operated as closely as possible against obstructions, such as fences and buildings, without fear of damaging the cutting blade or the obstructions.

Secured to the outer end *24'* of the forwardly extending portion [24] is a rod or bar 25 which is bent downwardly therefrom to provide a ground engaging shoe. The outer end [24'] of bar 25 is preferably bent around the extreme outer end *24'* of portion 24 and its inner portion is curved inwardly for attachment to the sleeve 7, thereby affording an additional support for the outer end of the shield 20 and a guide for directing the material to be cut into the path of the cutting blade.

In its operation, the machine is pushed forwardly with the shoe formed by the member 25 in engagement with the ground. The height of the shoe is such that the axis of the rotating shaft *8* [7] is tipped or inclined slightly forward in the direction of normal movement of the machine so that the cutting blade will revolve in a plane forming a slight angle with the ground, with the blade as it revolves being closer to the ground in front of the shaft 8 than at the rear thereof. This feature has been found to be of very great importance in mowing machines having a cutting blade rotating on an upright axis since the efficiency of the machine of the present embodiment of the invention is greatly reduced when the cutter blade is permitted to revolve in a horizontal plane, i. e. a plane horizontal to the ground over which the machine passes.

Adjustably secured to the frame of the machine a substantial distance above the revolving cutter blade is a high weed guard or gatherer 26. This guard extends from one side of the frame, is bent to curve around the shaft 8 and its supporting sleeve 7 and extends in a forward direction to the opposite side of the machine above the portion 24 of the shield 20 so that the weeds severed by the cutting blade 16 will be carried to the right of the machine, as viewed in Figure 1, and out of the path of the blade. The guard is preferably curved again and terminates in a forwardly extending portion 27 which is disposed in advance of the cutter blade and is adapted to extend into relatively tall uncut material eliminating any tendency of the machine to veer away from the direction in which it is being moved.

The inner end 28 of the high weed guard extends transversely of the frame members 4 and is adjustably secured thereto by U-shape brackets 29 each of which is provided with a set screw 30 whereby the high weed guard may be securely fastened to the frame. To maintain the guard in the desired substantially horizontal position and prevent it from turning in the apertures in the U-shape brackets 29, a member 31 is preferably welded or otherwise secured to the inner end 28 of the guard which terminates in a hook portion 32 adapted to cooperate with one of the members of the frame. Since the high weed guard will tend to rotate in a direction permitting the forward end 27 thereof to move downwardly, it will be perceived that the member 31 by passing beneath the frame member will effectually prevent such undesirable rotation of the guard.

It is to be observed that the axis of rotation of the shaft 8 is offset from a longitudinally extending line midway between the wheels 3. Thus, as shown in Figure 1 particularly, the wheel on the side of the machine adjacent the shield 20 is spaced inwardly therefrom and will not, therefore, interfere with the rotating cutter being placed closely adjacent an obstruction such as a fence so that grass or weeds within a few inches of the fence may be effectively cut.

Various modifications may be made in the embodiment of the invention here illustrated and described without departing from the spirit and scope of the invention as defined in the appended claims.

What I claim is:

1. A mowing machine for grass, weeds and the like involving a wheel support, frame means connected to said support, a substantially upright rotatable shaft at the forward end of said frame having a revolving cutter blade at its lower end, and a safety shield partially encircling the path of movement of the ends of said blade, said shield having a forwardly projecting portion extending in the direction of movement of the machine substantially tangential to the path of movement of the outer ends of said blade adapted to extend into the material to be cut at one side of the path of rotation of the ends of said blade, said portion being engageable with the ground for guiding the machine.

2. A mowing machine for grass, weeds and the like involving a pair of wheels, an axle connecting the wheels, a frame supported on said axle and extending in opposite directions therefrom, a rotatable shaft mounted on said frame adjacent the forward end thereof and having a revolving cutter blade at its lower end, handle means rigid with the opposite end of the frame for guiding it in its forward movement, and a safety shield partially encircling the path of movement of the outer end of said blade, one end of said shield terminating in a portion extending forwardly of said blade in the general direction of forward movement of the machine in engagement with the ground and adapted to extend into and divide the material to be cut by said blade.

3. A mowing machine for grass, weeds and the like involving a support mounted upon a pair of wheels, a frame carried by said support having a substantially upright rotatable shaft at the forward end thereof, said shaft having a revolving cutter blade at its lower end, a shield partially encircling the path of movement of the ends of said blade, said shield having a portion at one side of the machine extending forwardly in the direction of movement thereof, and means on the outer end of said portion engageable with the ground, said ground engaging portion guiding the machine and resisting any tendency of the machine to turn.

4. A moving machine for grass, weeds and the like involving a wheeled support, a frame having laterally spaced members carried by the support, an upright rotatable shaft having a cutter blade at its lower end rigidly secured to one end of said frame, handle means for guiding the forward movement of the machine, and rod-like means mounted on said frame and extending forwardly therefrom beyond said cutter blade, said means extending forwardly from one side of the machine to the other above the cutter blade to guide cut material out of the path of rotation of said blade the forward end of said means being adapted to penetrate relatively high material being cut in advance of the revolving blade, the inner end of said means being adjustably connected to said spaced members of the frame.

5. A mowing machine for grass, weeds and the like involving a wheeled support, a frame carried by said support having a rotatable shaft provided with a revolving blade at its lower end, said frame having laterally spaced portions leading to said rotatable shaft, and a high weed guard adjustably connected to said portions of the frame and extending around said shaft in spaced relation thereto, the forward portion of said guard extending from one side of the machine to the other and terminating in a portion extending in the general direction of forward movement of the machine, said terminal portion being adapted to extend into relatively high material being cut for preventing the machine from veering away for said material by engagement of the revolving blade therewith.

*6. The mowing machine of claim 1 wherein there is also provided a high weed guard mounted adjacent the forward end of said frame, said guard having its forwardmost portion disposed generally above and on the same side of said machine as the said forwardly projecting portion of said shield, said guard extending rearwardly from said forwardmost portion toward the opposite side of said machine above and across the forward part of the rotational circle of said cutter blade.*

*7. The moving machine of claim 4 wherein there is also provided a ground-engaging shoe supportingly-connected to the forward end of said frame, said shoe being disposed on said other side of said machine and generally below the forwardmost part of said rod-like means, said shoe projecting in the direction of forward movement of said machine.*

References Cited in the file of this patent or the original patent

UNITED STATES PATENTS

| | | |
|---|---|---|
| D. 34,141 | Edwards | Feb. 26, 1901 |
| 162,082 | Lorey | Apr. 13, 1875 |
| 384,787 | Richards | June 19, 1888 |
| 1,135,071 | Swanson | Apr. 13, 1916 |
| 2,114,096 | Noel | Apr. 12, 1938 |
| 2,208,972 | Goodall | July 23, 1940 |
| 2,359,358 | Dielshneider | Oct. 3, 1944 |
| 2,390,321 | Packwood | Dec. 4, 1945 |